(12) United States Patent
Kusabiraki et al.

(10) Patent No.: US 6,229,248 B1
(45) Date of Patent: May 8, 2001

(54) SOLDER ALLOY

(75) Inventors: Shigemasa Kusabiraki, Takaoka; Manabu Sumita, Toyama, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/259,136

(22) Filed: Feb. 26, 1999

(30) Foreign Application Priority Data

Apr. 14, 1998 (JP) .................................................. 10-102992

(51) Int. Cl.$^7$ ............................ B23K 35/22; C22C 13/00
(52) U.S. Cl. ........................ 310/348; 420/560; 420/561; 420/562
(58) Field of Search ............................................. 310/348

(56) References Cited

U.S. PATENT DOCUMENTS 5,352,407 * 10/1994 Seelig et al. ......................... 420/561

FOREIGN PATENT DOCUMENTS 5-50286 * 3/1993 (JP) ................................ B23K/35/26

* cited by examiner

*Primary Examiner*—Thomas M. Dougherty
(74) *Attorney, Agent, or Firm*—Ostrolenk, Faber, Gerb & Soffen, LLP

(57) ABSTRACT

The invention provides a solder alloy of Sn, Sb, Ag and Cu, wherein the Sb is about 1.0–3.0 wt %; the Ag is about 1.0 wt % or more and about 2.0 wt % or less; the Cu is about 1.0 wt % or less; and the remainder is Sn. The solder alloy has a comparatively low Young's modulus and sufficient tensile characteristics. Therefore, it resists peeling from the bonded electrode, etc., even though a heat stress is added. Also, a solder which has an excellent solderbility to metal phases such as Cu and Ni can be provided. Therefore, a solder alloy excellent in thermal shock resistance can be provided. The solder alloy may be used for soldering the inside of an electronic component.

21 Claims, 3 Drawing Sheets

SOLDER ALLOY

BACKGROUND OF THE INVENTION

1. Field of the Invention

This invention relates to a solder alloy suitable for bonding a terminal etc., for example, in an inside of an electronic component, and, more particularly, relates to a solder alloy having excellent thermal shock resistance.

2. Related Art of the Invention

Conventionally, a structure which contains a piezoelectric resonator in a package which does not obstruct oscillation of a piezoelectric resonator has been widely used in piezoelectric resonance components, etc. In these types of piezoelectric resonance components, the piezoelectric resonator and an electrode and a terminal, etc. which are disposed on the package are bonded with solder.

In the solder for bonding to the inside of an electronic component, i.e., a so-called internal solder, heat stress resistance at the time of the soldering for mounting an electronic component in a printed circuit board etc. is required. Therefore, it is strongly required that the internal solder be difficult to melt by heat stress at the time of mounting electronic-component and be characterized by being difficult to cause cracks, etc.

Conventionally, an eutectic solder of Sn—Pb with a comparatively high melting point and Sn—Sb eutectic solder are used as the internal solder to withstand the heat stress in mounting the electronic components.

When prevention of diffusion of solder to the electrode surface is required, a Pb-rich composition eutectic solder such as an eutectic solder of the composition which includes 60 wt % of Sn and 40 wt % of Pb is used.

When a prevention of solder diffusion such as by forming Ni barrier phase on an electrode surface is desired, a Sn-rich solder such as Sn—Sb system eutectic solder is used.

However, the above described internal solders have a problem in that the thermal shock resistance is not sufficient.

In Sn—Pb system eutectic solder, a Pb-rich phase (alpha-phase) and a Sn-rich phase (beta-phase) grow. However, there is the problem that a correlation crack is produced between the alpha-phase and the beta-phase or that a crack in the alpha-phase is produced.

In Sn—Sb system solder which does not contain Pb, such as the above Sn—Sb system solder, the above described cracks are hardly caused. However, the Sn—Sb system solder has a high Young's modulus. Therefore, when a heat stress is imposed, the solder easily mechanically damages the electrodes, and easily causes electrode peeling, etc.

SUMMARY OF THE INVENTION

To overcome the above described problems, preferred embodiments of the present invention provide a solder alloy having an excellent thermal shock resistance. When a heat stress is imposed, it is difficult to cause a crack. Also, it is hard to mechanically damage bonded electrodes.

One preferred embodiment of the present invention provides a solder alloy comprising a metal alloy of Sn, Sb, Ag and Cu, wherein: the amount of the Sb is about 1.0–3.0 wt %; the amount of the Ag is about 1.0 wt % or more and about 2.0 wt % or less; the amount of the Cu is about 1.0 wt % or less; and the remainder is Sn.

The above described solder alloy has a comparatively low Young's modulus and sufficient tensile characteristics. Therefore, it is hard to cause peeling from the bonded electrode, etc., even though a heat stress is present. Also, a solder which has an excellent solderbility to metal phases such as Cu and Ni can be provided. Therefore, a solder alloy excellent in thermal shock resistance can be provided.

The above described solder alloy may be used for soldering the inside of an electronic component.

When using the above described solder alloy as internal solder of an electronic component, even though the heat stress is present at the time of the soldering in mounting the electronic component on a printed circuit board, etc., re-melting and electrode peeling hardly occur and cracks in the bonded internal solder can also be prevented reliably.

Other features and advantages of the present invention will become apparent from the following description of the invention which refers to the accompanying drawings.

DESCRIPTION OF PREFERRED EMBODIMENTS

Figure 1:
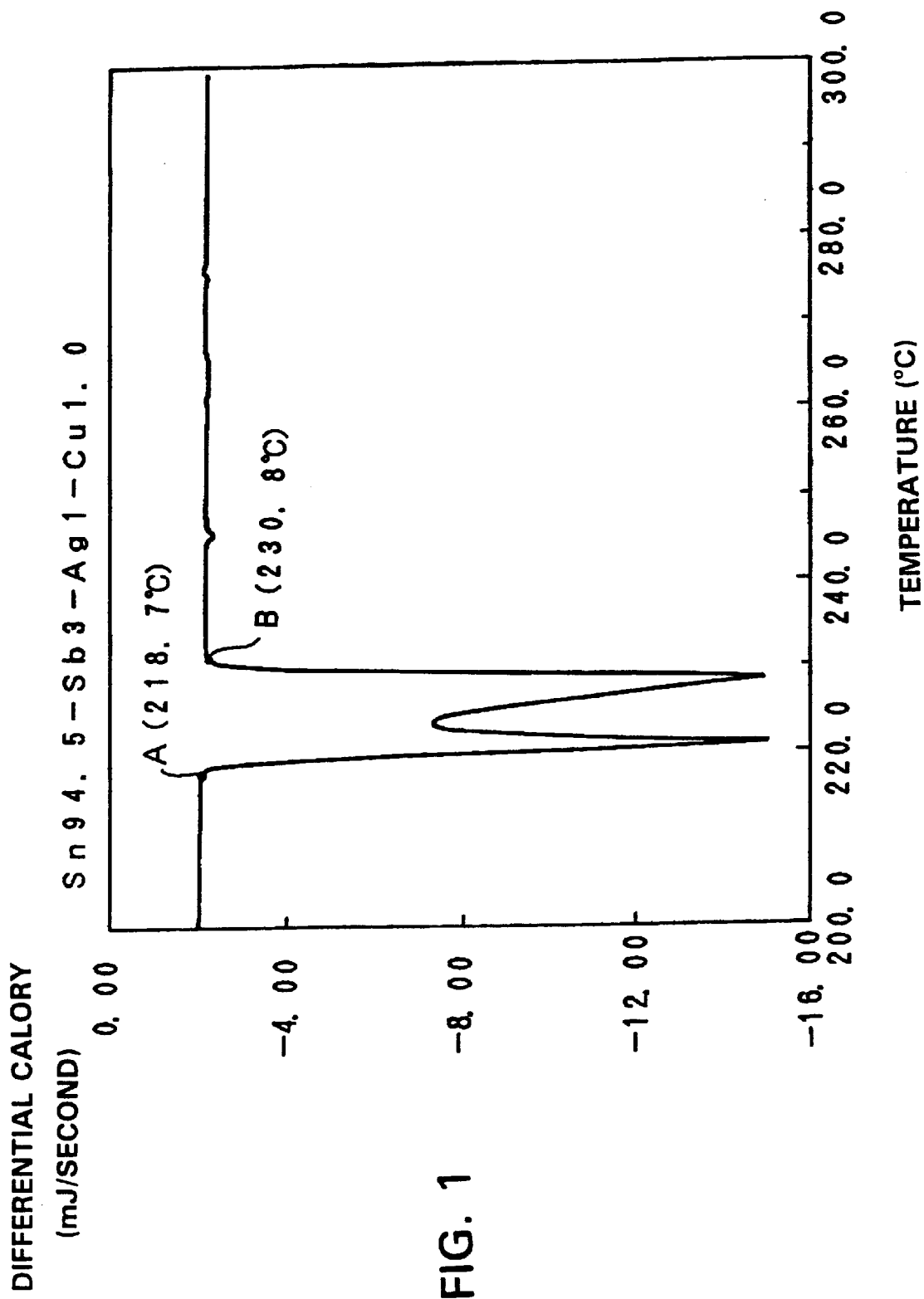
FIG. 1 shows an analytical result by DSC of Sn—Sb3.0-Cu1.0-Ag1.0 solder alloy which is one example of the present invention.

The inventors have tried various modifications of the composition of the Sn—Sb system solder alloy in which the above-mentioned crack is seldom encountered and examined the results zealously.

Generally, Sn system solder alloy has a high Young's modulus and it is easy to cause diffusion to an electrode, etc. Therefore, it is known that it will be easy to cause peeling from an electrode.

The inventors produced the various Sn system solder alloy shown in the following Table 1, based on a Sn—Sb system solder alloy. The various Sn system solder alloys have been tried to make a stable Sn compound which decreases the diffusion to an electrode and eases the stress to an electrode to some extent.

It is noted that sample number 1 in Table 1 consists only of Sn. In a sample number 2, "Sn—Cu0.75" means that Cu is included in an amount of 0.75 wt %, and the remainder consists of Sn. Similarly, in the following sample numbers 3–16, the numeric characters written after chemical element symbols shall show the amount ratio (wt %) of the element contained therein.

Moreover, sample numbers 3–8 show examples which contain Sb and Cu added at various ratio to a Sn— Ag3.5 composition. On the other hand, sample numbers 9–13 show examples which contain Cu and Ag added at various ratio to a Sn—Sb3.0 composition. Furthermore, sample numbers 14–16 show examples which contain Ag added at various ratio to a Sn—Sb composition.

Moreover, Table 1 shows (1) tensile characteristics, (2) DSC fusion temperature, and (3) soldering time (Cu plate) of each composition of the solder alloy of sample numbers 1–16 described above.

(1) As the above described tensile characteristics, tensile strength, elongation and Young's modulus are shown. These values are respectively measured according to JIS K 6200.

(2) The value of DSC fusion temperature is obtained by using a differential scan calorimetric-analyser (DSC). In Table 1, the upper-limit temperature of solidus-line means the temperature of the changing point from the solidus line to a heat absorption peak. The lower-limit temperature of liquidus-line means the temperature of the changing point from the heat absorption peak to the liquidus line. Moreover, peak temperature means the temperature of a heat absorption peak.

(3) The soldering time (Cu plate) is measured according to JIS C5033, and shows the zero cross time in use of R flux in each temperature described in Table 1, when the solder alloy of each composition is deposited on the Cu plate. Short soldering time means that solderability is excellent.

eutectic alloy of the sample numbers 3–8 or the Sn—Cu eutectic alloy of the sample number 2.

Furthermore, as clear from a comparison with the sample numbers 3–8 and the sample numbers 14–16, when Ag is added, the upper-limit temperature of the solidus-line reduces and solderability can be improved.

From the results described above, it is discovered that when the composition of sample number 13, that is, a solder alloy with composition of 3.0 wt % of Sb, 1.0 wt % of Cu, 1.0 weight % of Ag and remainder Sn is used, favourable tensile characteristics are obtained, upper-limit temperature of solidus-line is lowered and solderability can be improved.

TABLE 1

| | | Tensile characteristic | | | DSC fusion temperature | | Soldering time | |
| | | | | | | | (Cu plate) | |
| Sample No. | Composition of Alloy | Tensile strength (kg/mm$^2$) | Elongation (%) | Young's modulus (kg/mm$^2$) | Upper-limit temperature of solidus-line (° C.) | Peak temperature (° C.) | Lower-limit temperature of liquidus-line (° C.) | 260° C. (second) | 280° C. (second) |
|---|---|---|---|---|---|---|---|---|---|
| 1 | Sn(100) | | | 5300 | | | | | |
| 2 | Sn—Cu0.75 | 3.8 | 57 | 4221 | 226 | 227 | 227 | 1.56 | 1.28 |
| 3 | Sn—Ag3.5 | 4.7 | 54 | 3500 | 219 | 221 | 221 | 2.12 | 1.49 |
| 4 | Sn—Ag3.5—Sb1.0 | 5.5 | 45 | 4768 | 222 | 225 | 225 | 1.95 | 1.07 |
| 5 | Sn—Ag3.5—Sb3.0 | 6.1 | 46 | 4952 | 225 | 228 | 228 | 2.23 | 1.25 |
| 6 | Sn—Ag3.5—Cu0.5 | 5.3 | 48 | 4536 | 217 | 220 | 220 | | |
| 7 | Sn—Ag3.5—Cu1.0 | 5.3 | 46 | 4644 | 217 | 220 | 232 | | |
| 8 | Sn—Ag3.5—Cu1.5 | 5.2 | 23 | 5018 | 217 | 219 | 268 | | |
| 9 | Sn—Sb3.0 | 3.2 | 50 | 4864 | 235 | 239 | 239 | 5.28 | 2.03 |
| 10 | Sn—Sb3.0—Cu0.5 | 4.2 | 50 | 4674 | 230 | 233 | 233 | | |
| 11 | Sn—Sb3.0—Cu1.0 | 4.6 | 42 | 4854 | 230 | 234 | 240 | 4.48 | 2.05 |
| 12 | Sn—Sb3.0—Cu1.5 | 4.8 | 29 | 4793 | 231 | 234 | 266 | 5.60 | 2.46 |
| 13 | Sn—Sb3.0—Cu1.0—Ag1.0 | 6.8 | 38 | 4037 | 219 | 229 | 229 | | |
| 14 | Sn—Sb5.0 | 4.0 | 43 | 4540 | 235 | 242 | 242 | | |
| 15 | Sn—Sb5.0—Ag1.0 | 6.3 | 42 | 4798 | 224 | 238 | 241 | | |
| 16 | Sn—Sb0.5—Ag0.5 | 3.7 | 38 | 4562 | 219 | 230 | 232 | | |

As is clear from a comparison with the solder alloys of the sample numbers 3 and 5 in Table 1, elongation is not reduced much even though Sb is added to the eutectic alloy of Sn—Ag3.5 to be 3.0 wt %. On the other hand, as is obvious from comparison with samples number 3 and 6–8, elongation reduces considerably when Cu is added to Sn—Ag3.5 eutectic alloy.

Moreover, as clear from a comparison with sample numbers 9–12, elongation reduces when Cu is added to a Sn—Sb eutectic alloy. When Cu is contained at the ratio of 1.5 wt % especially, elongation reduces considerably to 29%.

Moreover, as clear from a comparison with a sample number 13 and the sample number 11, elongation does not reduce much when the content ratio of Cu is 1.0 wt %, even though Ag coexists therewith. Also, as clear from the tendency of sample numbers 10–12, elongation will be reduced if Cu increases whenever Ag coexists.

In the sample number 11, Cu is added to Sn—Sb3.0 eutectic alloy in the amount of 1.0 wt %. In this case, the lower-limit temperature of liquidus-line is 240 degrees Centigrade. The temperature does not hardly change from the lower-limit temperature of the liquidus-line in the sample number 9.

On the other hand, Cu in the sample number 12 is at 1.5 wt % and the lower-limit temperature of Liquidus-line rises to 266 degrees Centigrade. This is considered to be because of Cu being in a supersaturation state.

Moreover, the Sn—Sb eutectic alloy of sample numbers 9–12 have low solderabilities compared with the Sn—Ag In addition, the analysis result by DSC of the solder alloy of the above described sample number 13 is shown in FIG. 1. The analysis results by DSC of the solder alloy of sample numbers 14 and 15 are respectively shown in FIG. 2 and FIG. 3.

By the way, it is known that a Young's modulus will be reduced by addition of Sb in Sn—Sb eutectic solder and an excellent tensile characteristic may be realised. On the other hand, if the content ratio of Sb is too high, solderability will reduce.

Therefore, an appropriate amount ratio of Sb for keeping good solderability was surveyed in the Sn—Sb—Ag—Cu solder alloy.

As shown in the following Table 2, each solder alloy of the sample numbers 17–19 with 1.0 wt % Ag, 1.0 wt % Cu, the amount ratio of Sb being varied to 2.0, 3.0 and 4.0 wt % and remainder Sn was produced, and the solder spread test is performed thereon as a substitution of a solderability evaluation.

The solder spread test is performed in such a way that 2 g of each solder alloy is mounted on Cu and Ni plates, and heated at 250 or 270 degrees Centigrade, and then the area of the melt solder is measured. The results are shown in the following Table 2.

TABLE 2

| Sample | | Solder Spread Ratio (%) | | | |
| --- | --- | --- | --- | --- | --- |
| | | Cu plate | | Ni plate | |
| No. | Composition of Alloy | 250° C. | 270° C. | 250° C. | 270° C. |
| 17 | Sn—Ag1.0-Cu1.0-Sb2.0 | 71.22 | 72.40 | 31.54 | 56.80 |
| 18 | Sn—Ag1.0-Cu1.0-Sb3.0 | 71.58 | 71.69 | 31.85 | 48.86 |
| 19 | Sn—Ag1.0-Cu1.0-Sb4.0 | 70.78 | 70.90 | poor bonding | 37.78 |

As is clear from Table 2, in a Sn—Ag1.0-Cu1.0Sb solder alloy, the composition of sample number 19 which has a Sb amount of 4.0 wt % produced poor bonding when the bonding is performed at 250 degrees Centigrade on the Ni plate. The reason of the poor bonding may be insufficient heat capacity. That is, when the amount of Sb exceeds about 3.0 wt %, the solderability at 250 degrees Centigrade reduces extremely. Therefore, in the above described Sn—Ag—Cu—Sb alloy, the amount of Sb needs to be about 3.0 wt % or less.

As to the lower limit of the amount ratio of Sb, a comparison of the sample numbers 4 and 5 reveals that the amount of 1.0 wt % Sb is equivalent to the amount of 3.0 wt % Sb in terms of tensile characteristics. Therefore, the lower limit of the amount of Sb should be about 1.0 wt % or more. As a result, the amount of Sb is about 1.0–3.0 wt % in the present invention.

As to the amount of Cu, it is necessary to be about 1.0 wt % or less as described above. The reason will be explained hereinafter based on the following examples.

In Sn—Sb3.0-Ag1.0-Cu alloy, four kinds of solder are produced with the amount of Cu as 1.0, 1.2, 1.4 and 1.5 wt %. Then, the lower-limit temperature of liquidus-line of each solder are measured by DSC. The results are shown in the following Table 3.

TABLE 3

| Amount ratio of Cu (%) | 1.0 | 1.2 | 1.4 | 1.5 |
| --- | --- | --- | --- | --- |
| lower limit temperature of liquidus-line (° C.) | 229 | 250 | 260 | 266 |

As clearly seen from Table 3, when changing the amount of Cu to 1.2 wt % from 1.0 wt %, the lower-limit temperature of the liquidus-line rises abruptly. From this result, it is considered that when the amount of Cu has 1.2 wt % or more, SnCu is easy to precipitate and the solderability reduces with the supersaturation of Cu.

In order to confirm this, as shown in the following Table 4, the alloy of sample numbers 20–22 i.e., Sn—Sb—Ag—Cu alloys in which the amount of Sb and Cu differs are produced and the solder spread tests as described above are performed. The results are shown in the following Table 4.

TABLE 4

| Sample | | Solder Spread Ratio (%) | | | |
| --- | --- | --- | --- | --- | --- |
| | | Cu plate | | Ni plate | |
| No. | Composition of Alloy | 250° C. | 270° C. | 250° C. | 270° C. |
| 20 | Sn—Ag1.0-Cu1.0-Sb2.0 | 71.58 | 71.69 | 31.85 | 48.86 |
| 21 | Sn—Ag1.0-Cu1.2-Sb3.0 | 71.57 | 71.52 | 42.53 | 47.56 |
| 22 | Sn—Ag1.0-Cu1.4-Sb4.0 | 70.42 | 71.62 | poor bonding | 44.83 |

As clearly seen from Table 4, when the amount of Cu is 1.4 wt %, poor bonding occurs because of insufficient heat capacity. Therefore, from the results of Table 4, it is considered that the amount of Cu should be 1.2 wt % or less. On the other hand, as clearly seen from Table 3, when varying the amount of Cu, the lower-limit temperature of liquidus line will rise abruptly when the amount of Cu is 1.2 wt %.

From the result of Tables 3 and 4, it is indicated that the amount of Cu should be about 1.0 wt % or less.

Moreover, from a comparison of sample numbers 6 and 7 and from a comparison of sample numbers 10 and 11 in Table 1, the tensile characteristic is almost the same between the amount 0.5 wt % of Cu and 1.0 wt % of Cu. Therefore, the amount of Cu is preferably about 0.5 wt % or more.

Figure 2:
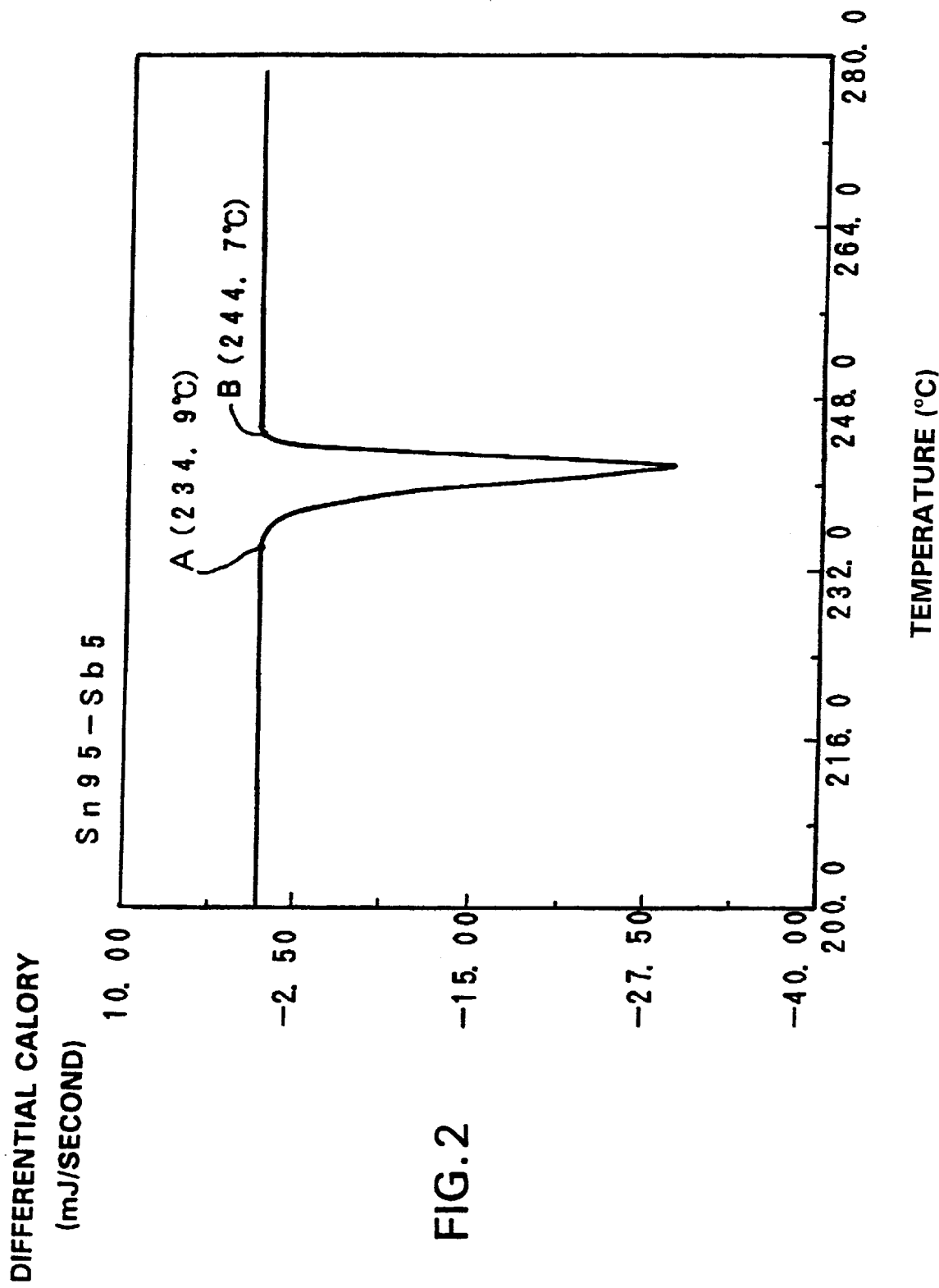
FIG. 2 shows an analytical result by DSC of Sn—Sb5.0 solder alloy.
Figure 3:
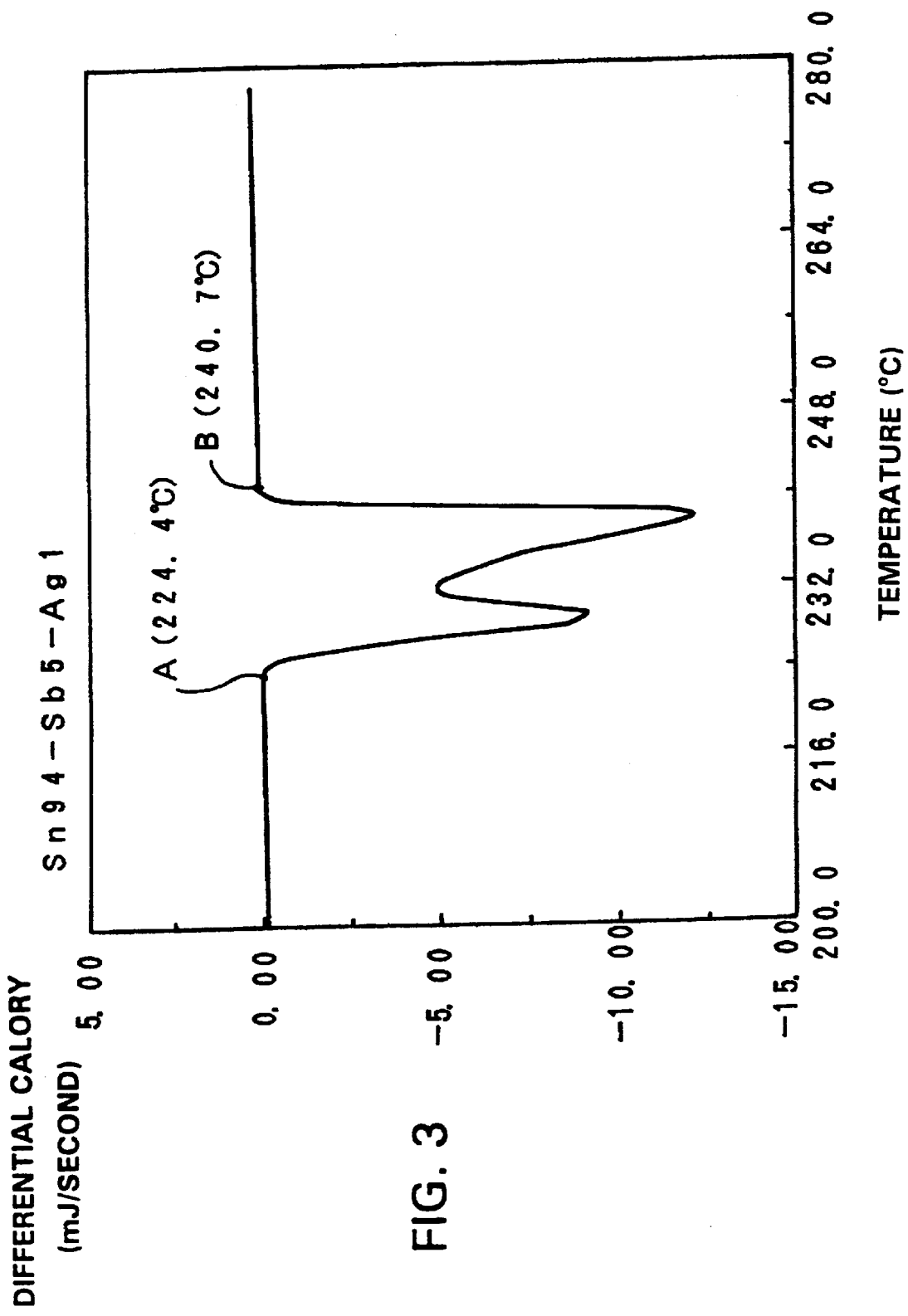
FIG. 3 shows an analytical result by DSC of Sn—Sb5.0-Ag1.0 solder alloy.

As to the amount of Ag, from a comparison of sample numbers 14 and 15 of Table 1 and from a comparison of FIGS. 2 and 3, the upper limit temperature of the solidus line is low at about 10 degrees Centigrade when the amount of Ag is 1.0 wt %. From the analysis result by DSC, it is realized that a heat absorption peak divides into two peaks.

Moreover, when the amount of Ag is 2.0 wt %, the majority of the heat absorption peak is shifted to the solidus line side, and it is confirmed that the liquidity of solder and the diffusion to an electrode easily progresses at low temperature.

Ag is added in order to improve solderability. However, as clearly seen from FIG. 1, in the solder alloy of the composition of Sn—Sb3.0-Cu1.0-Ag1.0, the upper limit temperature of solidus line is 219 degrees Centigrade and the lower limit temperature of liquidus line is 229 degrees Centigrade from the analysis result by DSC. That is, there is only about 10 degrees Centigrade difference between both temperatures. Therefore, even when the amount of Ag is increased, solderability may not be improved extremely. In other words, the upper limit of Ag amount ratio is sufficient to be about 2.0 wt %.

If the amount of Ag is too low, the upper limit temperature of solidus line will reduce and, when employing the solder as an internal solder of an electronic component, there is a possibility that the internal solder may re-melt when mounting the electronic component to the printed circuit board. Therefore, the low limit of the amount of Ag should be about 1.0 wt % in which the heat absorption peak temperature is about 229 degrees Centigrade. Therefore, from the above described result, the amount of Ag should be about 1.0 wt % or more and less than about 2.0 wt %.

As described above, from the results of the samples of Sn—Sb—Ag—Cu solder alloy shown in Tables 1 to 4 and FIGS. 1 to 3, a solder alloy having an excellent tensile characteristics and solderability and which is hard to melt at about 220 degrees Centigrade is provided when the amount of Sb is about 1.0–3.0 wt %, the amount of Ag is about 1.0 wt % or more and less than about 2.0 wt %, the amount of Cu is about 1.0 wt % or less and the remainder is Sn.

While the invention has been particularly shown and described with reference to preferred embodiments thereof, it will be understood by those skilled in the art that the forgoing and other changes in form and details may be made therein without departing from the spirit of the invention.

What is claimed is:

1. A Sn, Sb, Ag and Cu solder alloy wherein:
   the amount of the Sb is about 1.0–3.0 wt %;
   the amount of the Ag is about 1.0 wt %;
   the amount of the Cu is about 1.0 wt % or less; and
   the remainder is Sn.

2. The solder alloy according to claim 1, wherein the amount of the Cu is about 0.5 wt % or more.

3. The solder alloy according to claim 2, the amount of the Sb is about 3 wt %, and the amount of the Cu is about 1 wt %.

4. The solder alloy according to claim 2, the amount of the Sb is about 2 wt %, and the amount of the Cu is about 1 wt %.

5. In a method of soldering an electronic element to another element by a solder alloy, the improvement which comprises utilizing the solder alloy of claim 4 as said solder alloy.

6. In a method of soldering an electronic element to another element by a solder alloy, the improvement which comprises utilizing the solder alloy of claim 3 as said solder alloy.

7. In a method of soldering an electronic element to another element by a solder alloy, the improvement which comprises utilizing the solder alloy of claim 2 as said solder alloy.

8. In a method of soldering an electronic element to another element by a solder alloy, the improvement which comprises utilizing the solder alloy of claim 1 as said solder alloy.

9. In a combination where an electronic element is soldered to another element by a solder alloy, the improvement which comprises the solder alloy being the solder alloy of claim 1.

10. In a combination where an electronic element is soldered to another element by a solder alloy, the improvement which comprises the solder alloy being the solder alloy of claim 2.

11. In a combination where an electronic element is soldered to another element by a solder alloy, the improvement which comprises the solder alloy being the solder alloy of claim 3.

12. In a combination where an electronic element is soldered to another element by a solder alloy, the improvement which comprises the solder alloy being the solder alloy of claim 4.

13. An electronic component containing the combination of claim 12.

14. The electronic component of claim 13 comprising a package containing a piezoelectric resonator, and in which the electronic element comprises an electrode inside the package.

15. An electronic component containing the combination of claim 11.

16. The electronic component of claim 15 comprising a package containing a piezoelectric resonator, and in which the electronic element comprises an electrode inside the package.

17. An electronic component containing the combination of claim 10.

18. The electronic component of claim 17 comprising a package containing a piezoelectric resonator, and in which the electronic element comprises an electrode inside the package.

19. An electronic component containing the combination of claim 9.

20. The electronic component of claim 19 comprising a package containing a piezoelectric resonator, and in which the electronic element comprises an electrode inside the package.

21. A Sn, Sb, Ag and Cu solder alloy wherein:

the amount of the Sb is about 1.0–3.0 wt %;

the amount of the Ag is about 1.0 wt % or more and about 2.0 wt % or less;

the amount of the Cu is about 1.0 wt % or less; and the remainder is Sn;

wherein the amount of Sn, Sb, Ag and Cu are such that the alloy has a solidus-line temperature of 219° C. or more.

* * * * *